(12) United States Patent
Mishra et al.

(10) Patent No.: US 12,455,395 B2
(45) Date of Patent: Oct. 28, 2025

(54) ESTIMATION OF HYDRAULIC FRACTURE GEOMETRY USING DEEPLOOK CROSSWELL ELECTROMAGNETICS

(71) Applicant: Schlumberger Technology Corporation, Sugar Land, TX (US)

(72) Inventors: Shubham Mishra, Lucknow (IN); Vinil Kumar Reddy Mukku, Navi Mumbai (IN); Philippe Enkababian, Abu Dhabi (AE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 364 days.

(21) Appl. No.: 18/055,198

(22) Filed: Nov. 14, 2022

(65) Prior Publication Data

US 2023/0075327 A1  Mar. 9, 2023

Related U.S. Application Data

(63) Continuation of application No. 17/810,674, filed on Jul. 5, 2022, now abandoned.
(Continued)

(51) Int. Cl.
| | |
|---|---|
| *G01V 11/00* | (2006.01) |
| *E21B 47/00* | (2012.01) |
| *E21B 49/00* | (2006.01) |
| *G01V 1/30* | (2006.01) |
| *G01V 1/40* | (2006.01) |

(Continued)

(52) U.S. Cl.
CPC ............. *G01V 11/00* (2013.01); *E21B 49/00* (2013.01); *E21B 47/00* (2013.01); *E21B 49/003* (2013.01); *E21B 2200/20* (2020.05); *G01V 1/306* (2013.01); *G01V 1/40* (2013.01); *G01V 1/50* (2013.01); *G01V 3/38* (2013.01); *G01V 2210/66* (2013.01)

(58) Field of Classification Search
CPC . G01V 11/00; G01V 3/38; G01V 1/50; G01V 1/40; G01V 2210/66; G01V 1/306; E21B 49/00; E21B 2200/20; E21B 47/00; E21B 49/003
See application file for complete search history.

(56) References Cited

U.S. PATENT DOCUMENTS

| | | | |
|---|---|---|---|
| 2015/0083404 A1* | 3/2015 | Wilt | E21B 47/092 |
| | | | 166/250.1 |
| 2015/0204174 A1* | 7/2015 | Kresse | G06F 30/28 |
| | | | 166/250.01 |

(Continued)

FOREIGN PATENT DOCUMENTS

| WO | WO-2021016212 A1 * | 1/2021 | ............ E21B 43/26 |
|---|---|---|---|

OTHER PUBLICATIONS

FrontierMedia (âFracking Fluid, Flowback, and Formation Water: Whatâs the Difference?â, Well Water Solutions and Rentals, Inc. Oct. 5, 2016) (Year: 2016).*

(Continued)

*Primary Examiner* — Lisa M Caputo
*Assistant Examiner* — Christian T Bryant

(57) ABSTRACT

A method to estimate and model all or at least two parameters of hydraulic fracture geometry in predominantly horizontal or nearly horizontal wells, by use of inter-well electromagnetic recordings. In aspects, resistivity of the fracturing fluid is used in the modeling process.

16 Claims, 14 Drawing Sheets

Related U.S. Application Data

(60) Provisional application No. 63/218,010, filed on Jul. 2, 2021.

(51) Int. Cl.
  *G01V 1/50* (2006.01)
  *G01V 3/38* (2006.01)

(56) References Cited

U.S. PATENT DOCUMENTS

| | | | |
|---|---|---|---|
| 2016/0201447 A1* | 7/2016 | Hoversten | E21B 49/00 702/7 |
| 2017/0059738 A1* | 3/2017 | Hibbs | G01V 11/00 |
| 2017/0074998 A1* | 3/2017 | McColpin | G01V 1/42 |
| 2018/0016895 A1* | 1/2018 | Weng | G01V 1/306 |
| 2018/0095184 A1* | 4/2018 | Hogarth | G01V 1/288 |

OTHER PUBLICATIONS

Mishra et al. ("High Accuracy Estimation of Hydraulic Fracture Geometry Using Crosswell Electromagnetics." Paper presented at the SPE Annual Technical Conference and Exhibition, Dubai, UAE, Sep. 2021. doi: https://doi.org/10.2118/206266-MS) (Year : 2021).*

Marsala et al. ("3D Inversion Practice For Crosswell Electromagnetic Surveys in Horizontal Wells in Saudi Arabia." Paper presented at the 2015 SEG Annual Meeting, New Orleans, Louisiana, Oct. 2015) (Year: 2015).*

Ren et al. (Uncertainty and Resolution Analysis of 2D and 3D Inversion Models Computed from Geophysical Electromagnetic Data. Surv Geophys 41, 47-112 (2020). https://doi.org/10.1007/s10712-019-09567-3) (Year: 2020).*

Zhang et al. ("Crosswell electromagnetic survey: An effective approach for reservoir-scale saturation mapping" Paper presented at the 2017 SEG International Exposition and Annual Meeting, Houston, Texas, Sep. 2017.) (Year: 2017).*

Mishra et al. ("Waterflood Surveillance by Calibrating Streamline-Based Simulation with Crosswell Electromagnetic Data." Paper presented at the International Petroleum Technology Conference, Beijing, China, Mar. 2019. doi: https://doi.org/10.2523/IPTC-19286-MS) (Year: 2019).*

Wilt et al., 1992: Cross-Borehole Electromagnetic Induction for Steam Flooding Monitoring , Electrical Methods IV: Electromagnetics II (4 pages).

Abubaker et al. 2005, A fast and rigorous 2.5D inversion algorithm for cross-well electromagnetic data: 75th Annual International Meeting, SEG, Expanded Abstracts, 534-537.

Marsala et al. 2008, Crosswell Electromagnetic Tomography: from Resistivity Mapping to Interwell Fluid Distribution. International Petroleum Technology Conference, IPTC 12229, Kaula Lumpur, Malaysia, Dec. 3-5, 2008 (6 pages).

Mishra et al., Waterflood Surveillance by Calibrating Streamline-Based Simulation with Crosswell Electromagnetic Data, IPTC-19286-MS, International Petroleum Technology Conference, Mar. 26-28, 2019 (10 pages).

Rabaa et al. Experimental Study of Hydraulic Fracture Geometry Initiated From Horizontal Wells (SPE 19720), SPE Annual Technical Conference and Exhibition, Oct. 8-11, 1989 (16 pages).

Weijers et al. Geometry of Hydraulic Fractures Induced From Horizontal Wellbores (SPE-25049-PA), SPE Production and Facilities, May 1994 (6 pages).

* cited by examiner

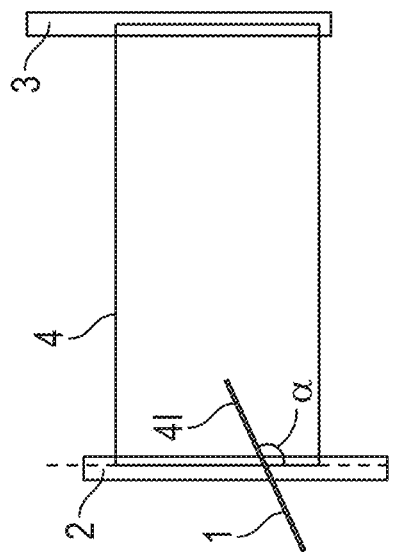
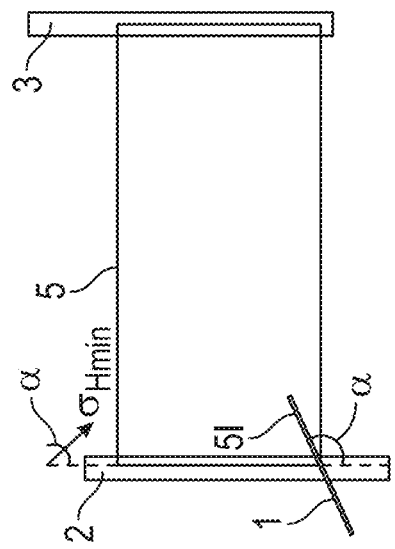
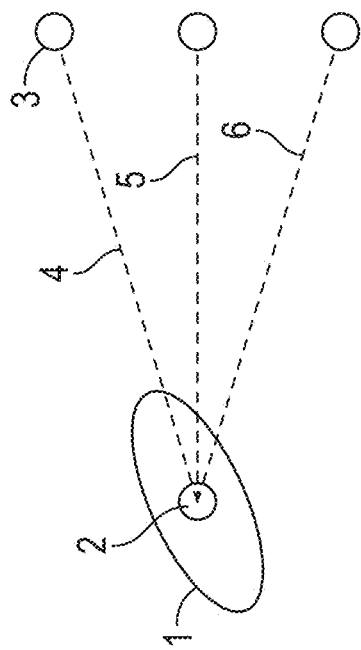
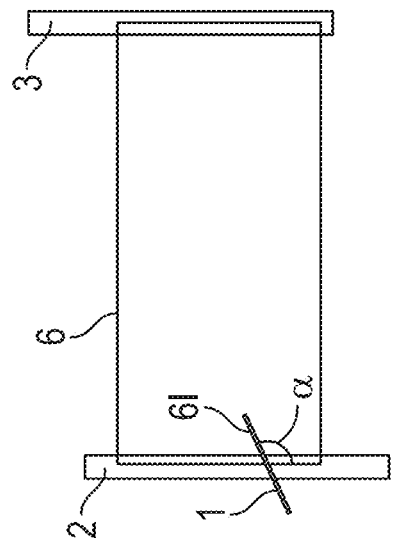
FIG. 5

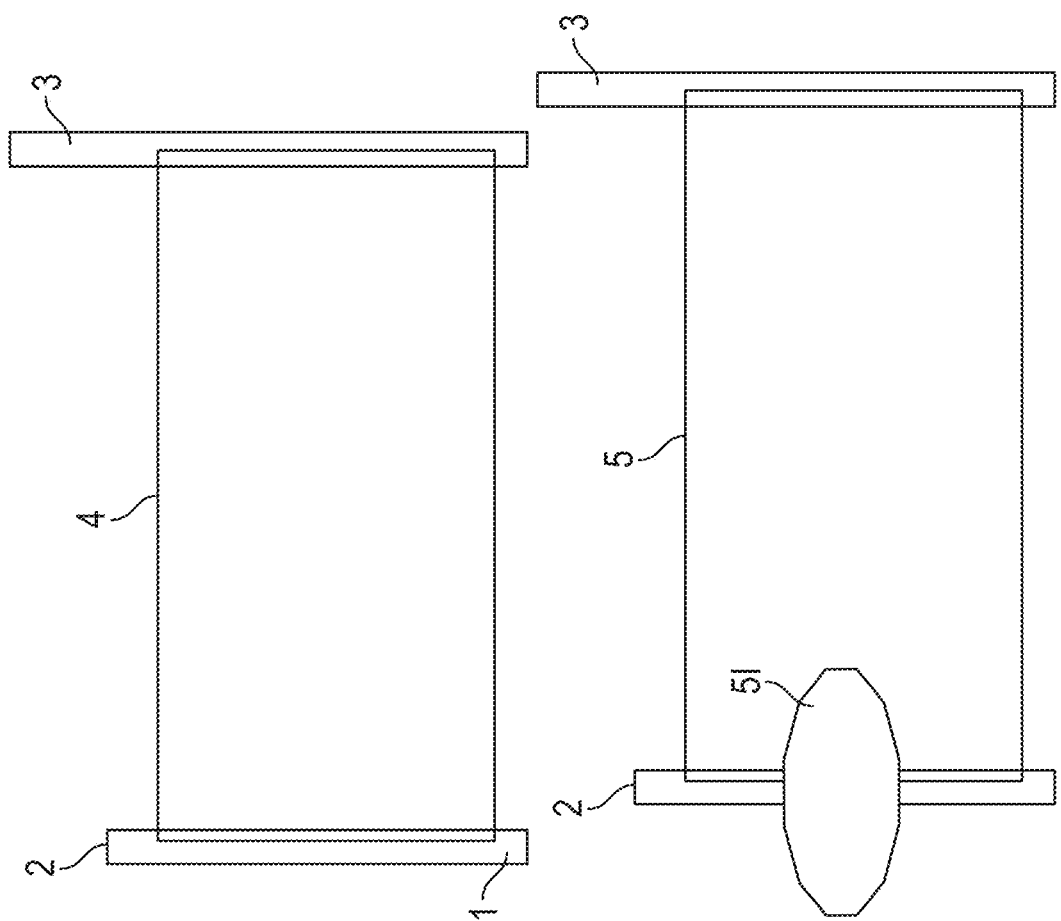
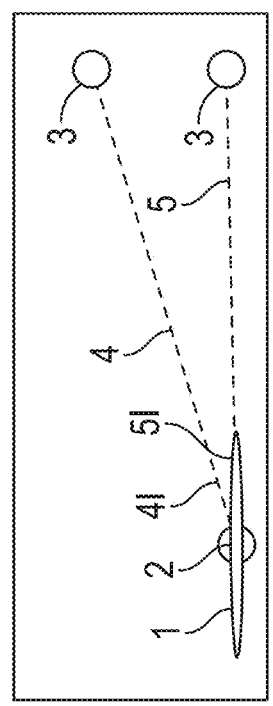
FIG. 10

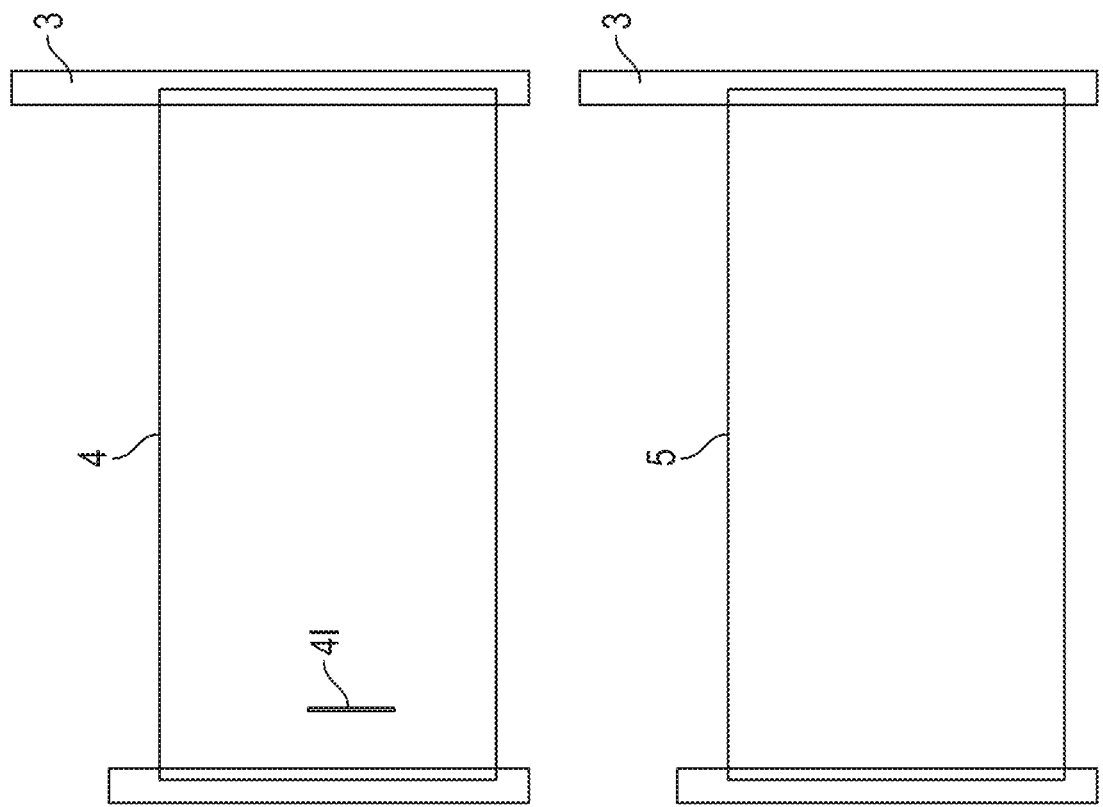
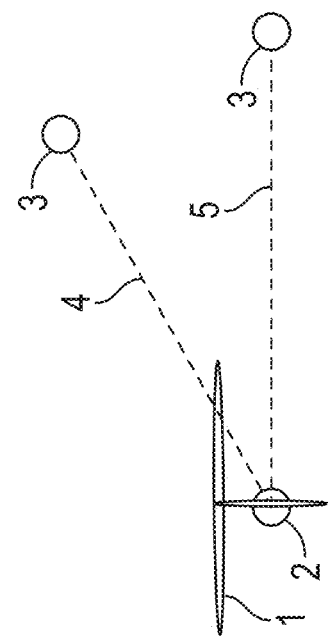
FIG. 11

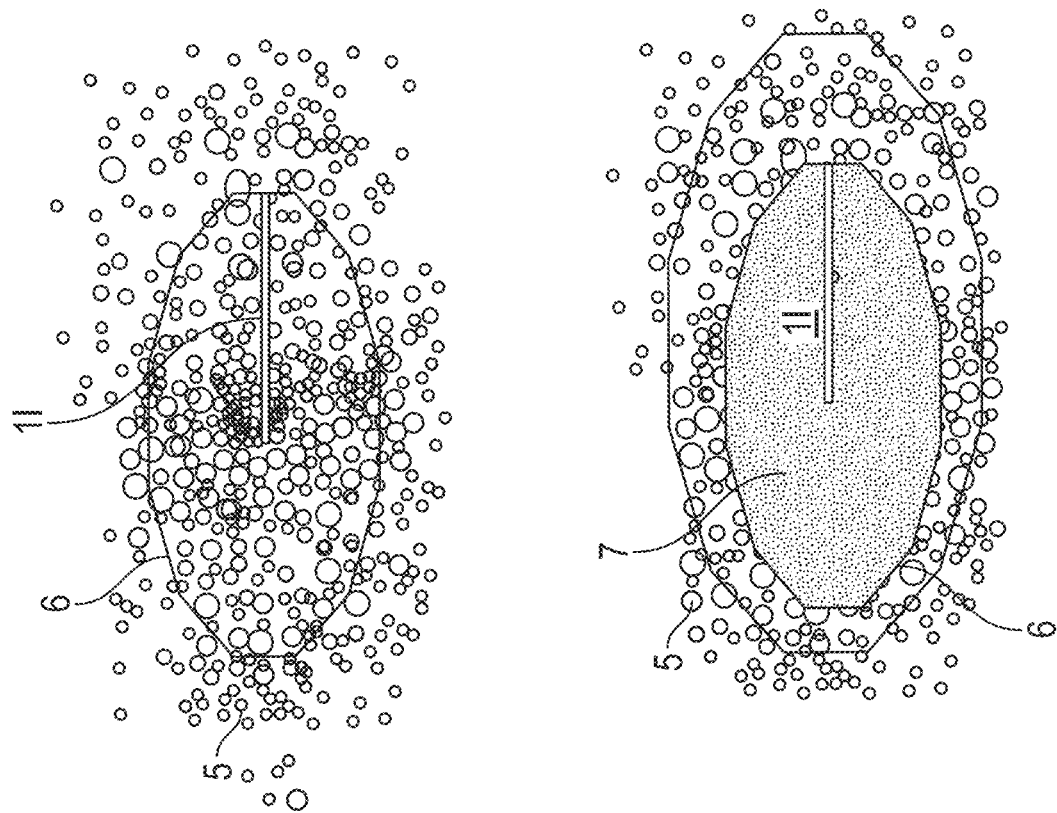
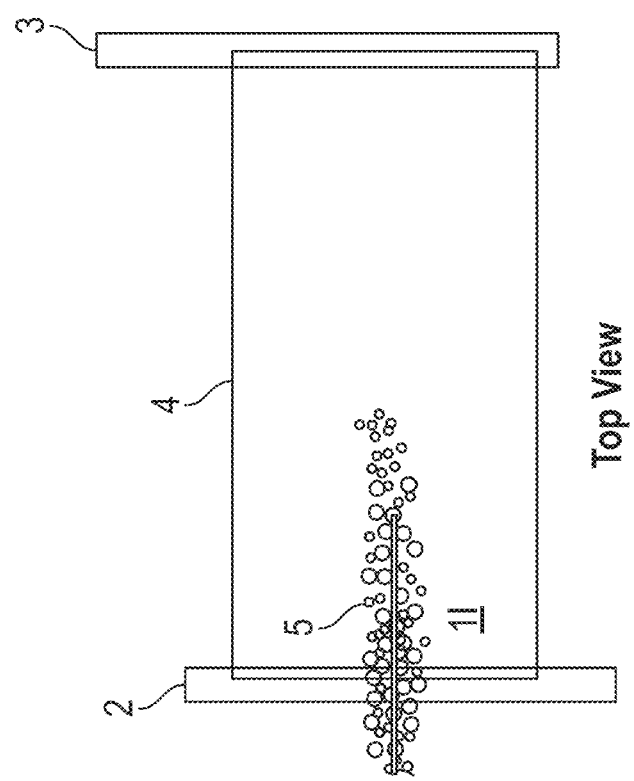
FIG. 12

ESTIMATION OF HYDRAULIC FRACTURE GEOMETRY USING DEEPLOOK CROSSWELL ELECTROMAGNETICS

CROSS-REFERENCE TO RELATED APPLICATIONS

This application is a continuation of U.S. non-provisional application Ser. No. 17/810,674, filed Jul. 5, 2022, which claims priority to and the benefit of U.S. Provisional Application No. 63/218,010, entitled "Estimation of Hydraulic Fracture Geometry Using Deeplook Crosswell Electromagnetics" and filed Jul. 2, 2021, each of which is incorporated by reference herein in its entirety for all purposes.

FIELD OF THE DISCLOSURE

Aspects of the disclosure relate to estimation of geological properties. More specifically, aspects of the disclosure relate to estimating hydraulic fracture geometry using electromagnetic technology.

BACKGROUND

Unconventional resources which are typically inherent with poor porosity & permeability are being economically developed only after the introduction of hydraulic fracturing (HF) technology, which is required to stimulate the hydrocarbon flow from these impermeable/tight reservoir rocks. Since 1960, hydraulic fracturing has been extensively used in the industry. Hydraulic fracturing is the process of (1) injecting fluids through the wellbore into the subterranean hydrocarbon formation, at high pressures sufficient enough to exceed tensile strength of the rock and hydraulically induce cracks/fractures (2) followed by injecting proppant-laden fluid into the open fractures and packing up the fracture with proppant pack, after the injected fluid leaks off into formation. The resultant proppant pack keeps the induced fracture propped open and thus creates a highly conductive flow path for the hydrocarbon to flow from the far-field subterranean formation into the wellbore.

Today, most of the modern wells in unconventional reservoirs are horizontal/near horizontal wells which are completed with large multiple HF treatments across the entire length of horizontal wellbore (lateral), to increase the reservoir contact per well. Productivity of these wells is dictated by the stimulated reservoir volume (SRV), which is dependent on number of fractures and conductive hydraulic fracture surface area of each fracture which is propped open. Therefore, estimation of this hydraulic fracture geometry (HFG) dimensions has become very critical for any unconventional field development. Key dimensions are hydraulic fracture length, height & its orientation, which are required to assess the optimum configuration of fracturing, well completion & reservoir management strategy to achieve maximum production. Designs can be assessed based on HFG observations and infill well trajectories, spacing etc. can be planned for further field development.

Horizontal wells are typically completed with multiple hydraulic fractures spaced across the entire wellbore. Completion plan involves multiple HF treatment stages starting from the wellbore toe-up, followed by isolation of the previous frac & injecting the next frac stage; this step repeated until the desired number of fracs are placed till the heel position. Most common & classic completion is cemented cased well with plug and perforation multi-stage techniques, involving a plug set-up to isolate the previous hydraulic fracturing and perforating for the next hydraulic fracturing. Open hole wellbores are completed with an uncemented casing mounted with inflatable packers for external isolation of fracturing stages and sliding sleeve completion to internally isolate the planned frac stages. These sleeves are activated by balls dropping from the surface into the wellbore, sealing the seat to open/close entry path to the fracturing stages.

Induced fracture geometry is dictated by the subterranean in-situ stresses which are represented by three principal stresses: vertical overburden stress (typically the largest), minimum (referred as $\sigma_{hmin}$) and maximum horizontal stresses (referred as $\sigma_{hmax}$). In embodiments, fractures initiate perpendicular to the $\sigma_{hmin}$ direction and in most of the cases forms a vertical 2D fracture plane in $\sigma_{hmax}$ direction, which is bi-wing and axi-symmetric on both sides of wellbore. If a well is in the $\sigma_{hmin}$ direction ($\theta=0°$), hydraulic fracture will be orthogonal to the wellbore axis (referred as transverse/orthogonal fracture) and the well is called as a transversely fractured/transverse well. If a well is drilled in the $\sigma_{hmax}$ direction ($\theta=90°$), an induced fracture is generated co-axial with the wellbore (referred further as longitudinal/axial fracture) and the well is called as a longitudinally fractured/longitudinal well. Sometimes wells are aligned at an angle ($\alpha$) with the $\sigma_{hmax}$ direction and the induced fractures are initiated at the corresponding angle ($\alpha$) to the wellbore. A transversely fractured wellbore enables placement of more number of frac stages, higher HF treatment volumes, resulting in higher SRV than longitudinally fractured well and this is the most preferred configuration for tight and unconventional wells.

In a subterranean zone with pre-existing natural fractures, a complex fracture network system (refer to figure) is created due to the combination of (1) initial fracture extension in maximum stress direction (2) extension along the natural fractures when intersected (3) continuation in original frac direction, forming an orthogonal set of interconnected fractures. This complex network is more aided by the low stress difference between principle horizontal stresses, which can sometimes result in a orthogonal frac network without natural fractures. In shallow formation depths, overburden earth weight will decrease leading to vertical overburden stress becoming the minimum stress, where induced fracture initiates as vertical plane near-wellbore and propagates into a horizontal plane (across any weak bedding planes), thus resulting in a T-shape fracture.

Most essential dimensions of a HFG which an engineer wants to evaluate are:
   Fracture extension length, height and its orientation. Fracture length is measured in quantity of fracture half-length which is a dimension of one wing at one side of the well, as typically fracture plane is bi-wing symmetric extension away from the wellbore in the direction of maximum stress (refer figure) in a homogenous stressed formation.
   Whether the fracture is single planar, vertical or complex fracture network.
   For a complex fracture network, half-length and half-width of the entire fracture network, across one side of the well.

Understanding the fracture growth and estimating the above dimensions is not an easy task. To estimate the above parameters, hydraulic fracture modelling is conducted using calibrated 1D mechanical earth models (MEM) constituting stress profile, rock mechanical properties and other petrophysical logs. Also the modern tools of hydraulic fracture modelling using 3D geomechanical models incorporating seismic, geological, petrophysical and geomechanical data are not able to rightly predict the fracture geometry. In case of a pre-existing natural fracture system, inputs of a discrete fracture network can be imported from the 3D geological models into the fracture models and embodiments of software herein can simulate fracture propagation across the fracture network, using unconventional fracture modelling (UFM) frac simulation engine. Validation of the fracture models is quintessential with the measurement of the HFG on few prototype wells in order to calibrate models and thus ensure confident fracture modelling for future wells.

Measurement of HFG is conducted by far-field and near-wellbore diagnostic methods. Far-field hydraulic fracture diagnostic, in embodiments, are microseismic and tiltmeter methods, involving data logging from an offset well during hydraulic fracturing operation, widely used for vertical to horizontal wells. Near-wellbore diagnostics are the most popular methods which measure fracture height, applicable for vertical/near-vertical fractured wells required to have fracture height coaxial with the wellbore. These diagnostics intend to measure changes in near-wellbore physical property such as sonic property, temperature, radioactivity, etc. to evaluate the hydraulic fracture height. These near-wellbore methods are inapplicable for (a) horizontal wells, highly deviated wells as the fracture vertical height never overlaps with wellbore (b) shallower wells having overburden vertical stress as the minimum (c) non-vertical fractures in highly tectonic regions, which alter the minimum stresses to an oblique angle.

For horizontal wells, far-field hydraulic fracture diagnostics such as microseismic and tiltmeter methods are the only applicable direct diagnostic methods. Fracture height can still be easiest HFG that can be assured from any measurement in offset vertical well fractured in the same subterranean zone and a calibrated 1D mem can also better model the height growth. Fracture length, shape and orientation, however, are the least known far-field dimensions even from the robust 3D modelling, and typically needs a monitor well to measure them. Far-field diagnostic methods which measure deformation/seismicity may be limited in predicting effective hydraulic fracture which is propped open and may overpredict the fracture dimensions with huge uncertainty. Propped fracture length is the most important primary frac parameter for any fractured well, to determine well productivity and plan future infill well development strategy.

A microseismic technique for hydraulic fracture geometry estimation may be used. The microseismic technique, however, may measure every break in the rock and may not differentiate between the tensile and shear failure, and the resultant geometry from microseismic is a cumulative of shear and tensile failure. The tensile failures are the spaces where hydraulic fracture proppants are housed and these failures result in contributing fracture geometry in production stage. Shear failures, on the other hand, are slippage rock-failures and do not usually remain open with proppants in the production stage. Shear failures, thus, become the non-contributing part of the hydraulic fracture. Therefore, the recording with a combination of both these failures may be an overestimation of the HFG.

There is a need to provide analysis of these situations that are more accurate than conventional analysis.

There is an additional need to provide for estimation of tensile fractures and HFG, not available with conventional analysis.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for estimating hydraulic fracture geometry includes performing a first cross-well electromagnetic survey between a first well and a second well to achieve first results, performing a hydraulic fracturing in one of the first well and the second well, performing a flow back in one of the first well and the second well, performing a second cross-well electromagnetic survey between the first well and the second well to achieve second results, performing a cross-well electromagnetic interpretation of the second cross-well electromagnetic survey, performing a cross-well electromagnetic calibration based upon results of the cross-well electromagnetic interpretation, comparing the first results with the second results to estimate a hydraulic fracture geometry in a two-dimensional plane, and validating a three-dimensional hydraulic fracturing model with the hydraulic fracture geometry in the two-dimensional plane.

In another example embodiment, the method for estimating hydraulic fracture geometry includes obtaining results from a first cross-well electromagnetic survey between a first well and a second well to achieve first results, obtaining results from a second cross-well electromagnetic survey between the first well and the second well to achieve second results, wherein the second cross-well electromagnetic survey is conducted after a hydraulic fracturing in one of the first well and the second well, performing a cross-well electromagnetic interpretation of the second cross-well electromagnetic survey, performing a cross-well electromagnetic calibration based upon results of the cross-well electromagnetic interpretation, comparing the first results with the second results to estimate a hydraulic fracture geometry in a two-dimensional plane, and validating a three-dimensional hydraulic fracturing model with the hydraulic fracture geometry in the two-dimensional plane.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

FIG. 5 is a depiction of a well that is drilled at other angles (a) with the $\sigma_{hmax}$ direction, intersection by a 2D horizontal/

Inclined planes that generate the fracture length low resistive trace at the same angle (a) with the wellbore.

Figure 6:
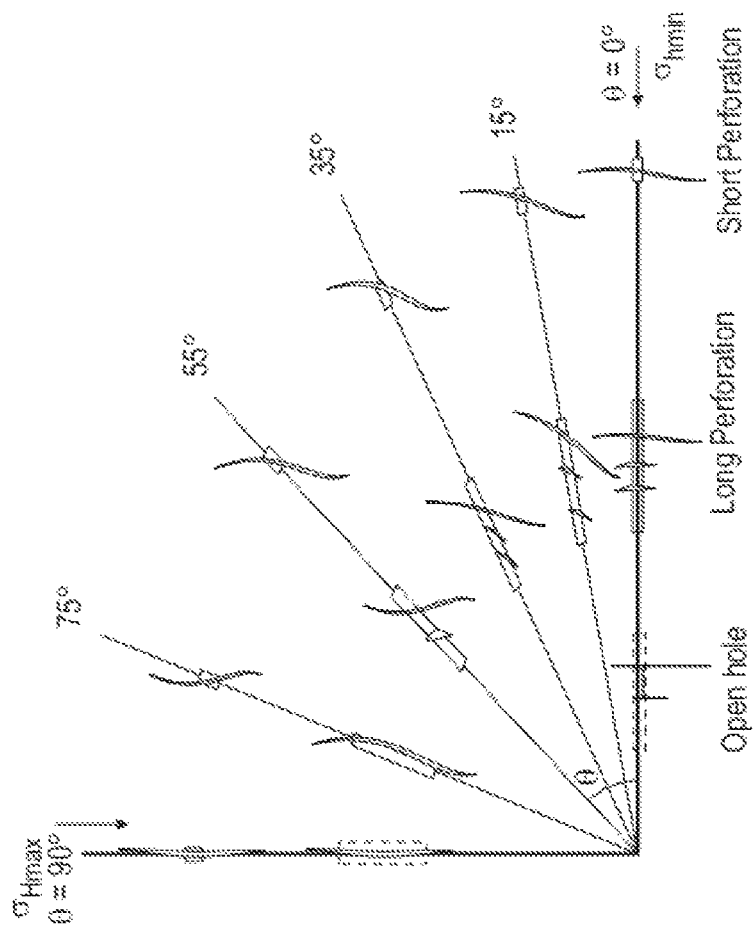
Figure 6A:
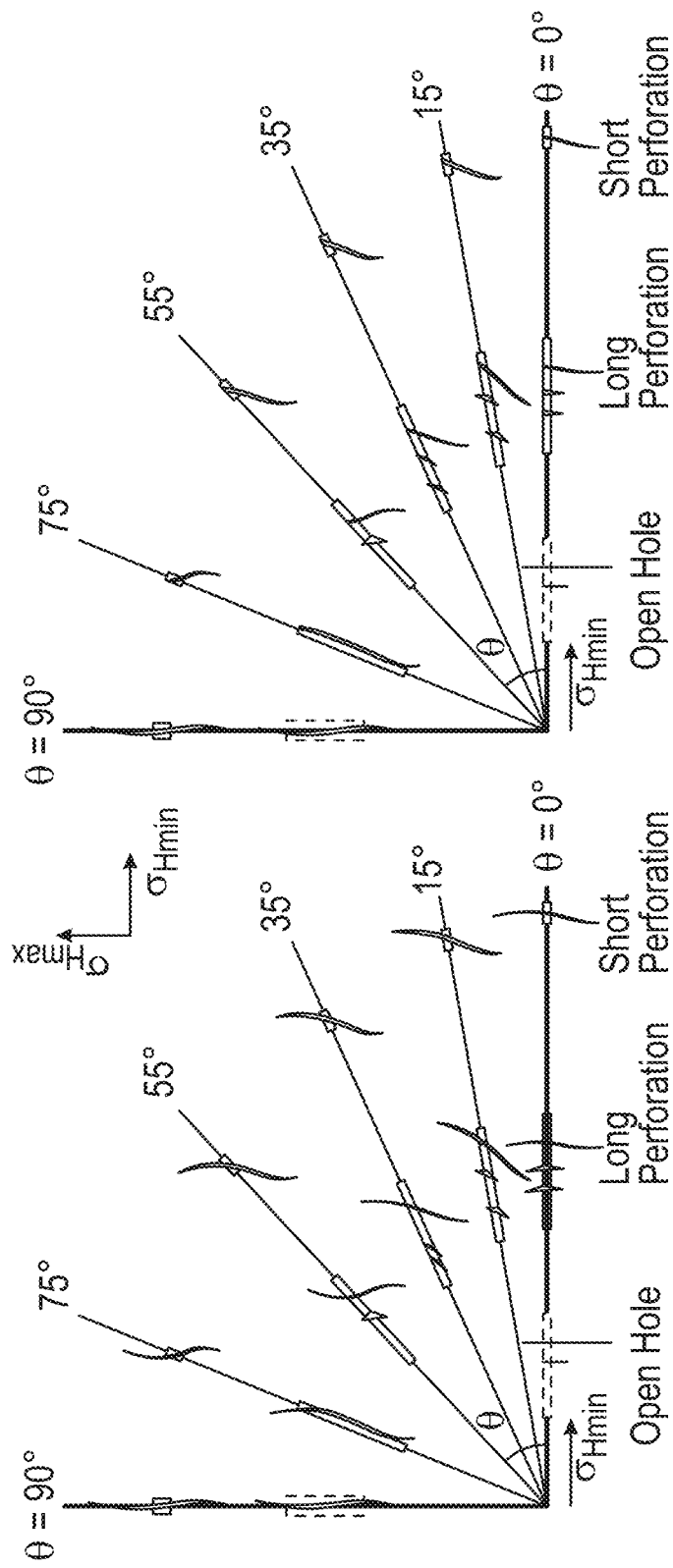

FIG. 6 shows the top view of fracture geometries for various wellbore angles with $\sigma_{hmin}$ (θ), from a longitudinal fracture (θ=90°) to a transverse fracture (θ=0°). FIG. 6A shows a comparison of a 2D plane low resistive fracture intersection with the top view of various non-aligned wellbore angle fractures.

Figure 7:
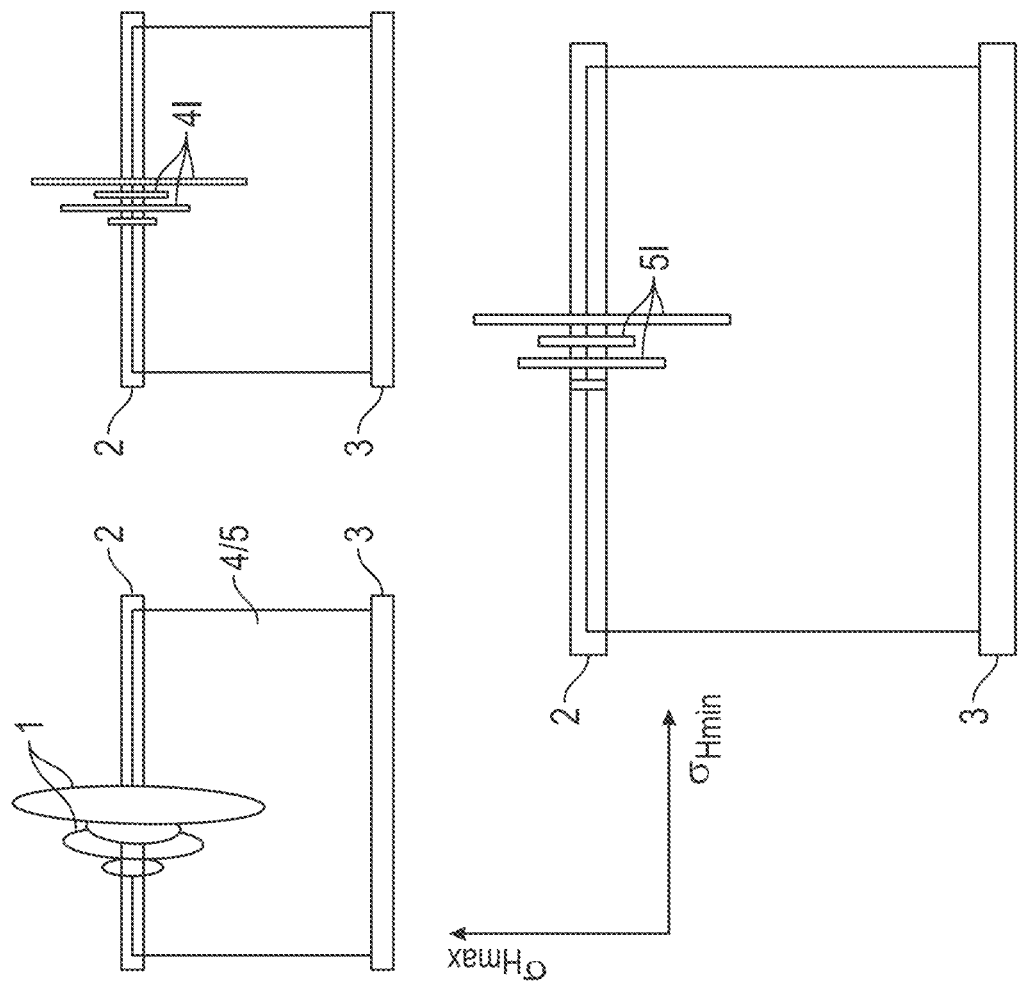

FIG. 7 is a depiction where multiple fractures compete with each other in the overlap area, as the overlapping fractures exert additional stress on each other (stress shadow effect) and few fractures cease to grow resulting in one or two dominant main fractures.

Figure 8:
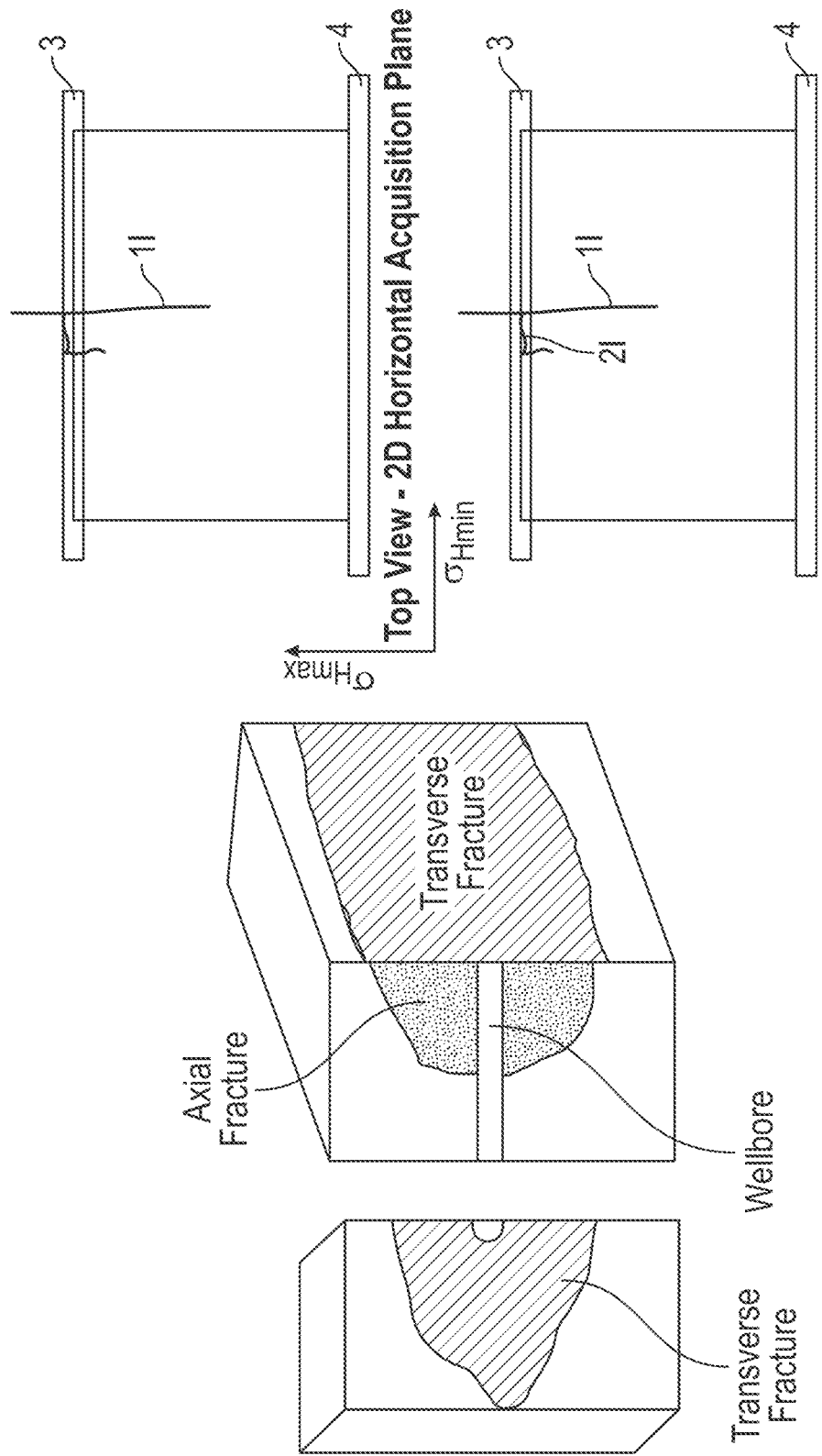

FIG. 8 is a spiral perforated interval that is less than four times well diameter where starter fractures coalesce into a single transverse main fracture (fan-like shape).

Figure 9:
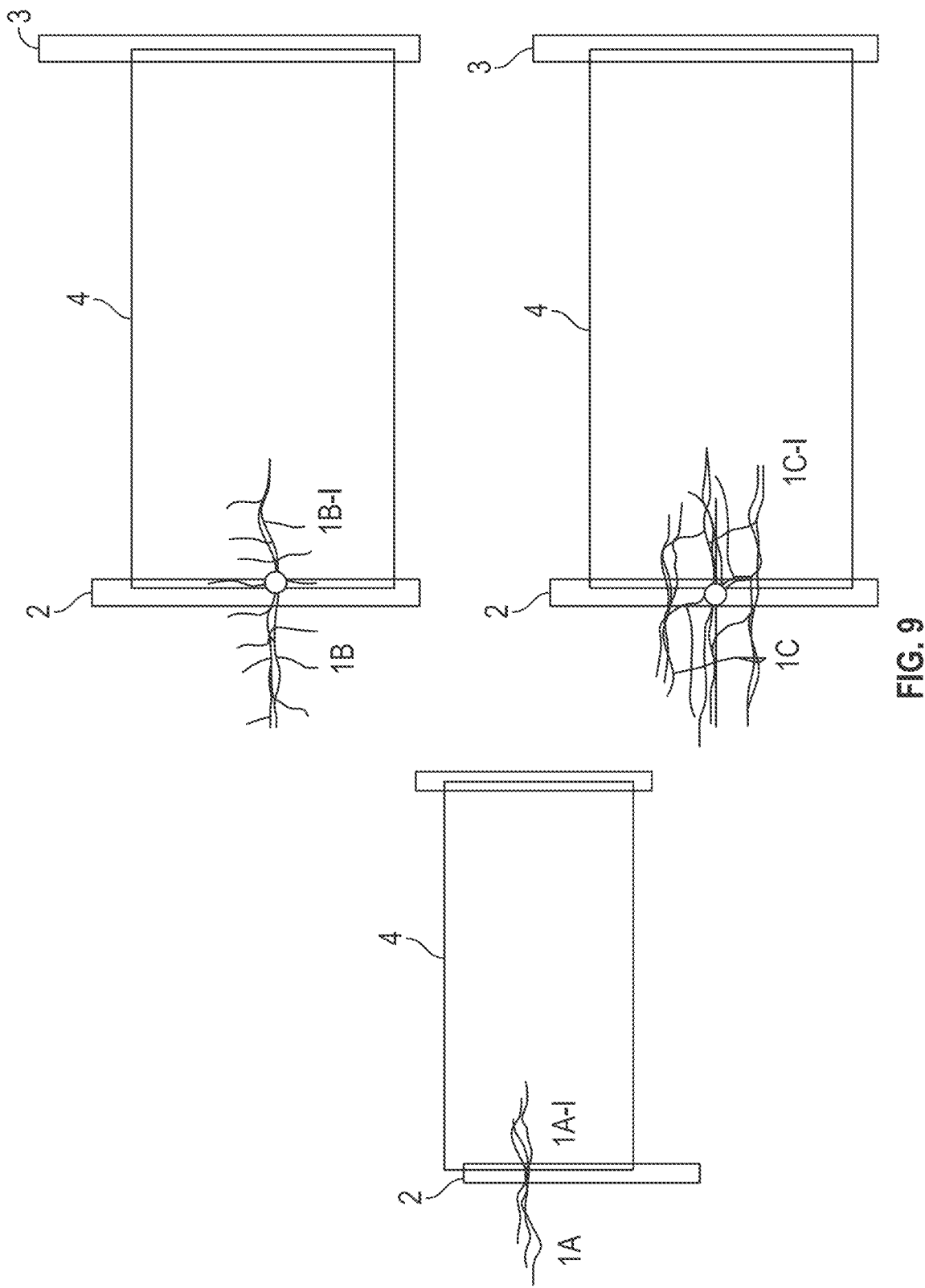

FIG. 9 is a depiction of a longitudinal fracture that initiates near-wellbore from top & bottom sides of the well due to altered hoop stresses until certain distance and further reorients into far-field transverse fracture which creates a sharp curvaceous fracture.

FIG. 10 is a graph of fracture propagation in one example embodiment of the disclosure.

FIG. 11 is a graph of a T-shape fracture propagation in one example embodiment of the disclosure.

FIG. 12 is a graph of a pan-cake horizontal fracturing in one example embodiment of the disclosure.

Figure 13:
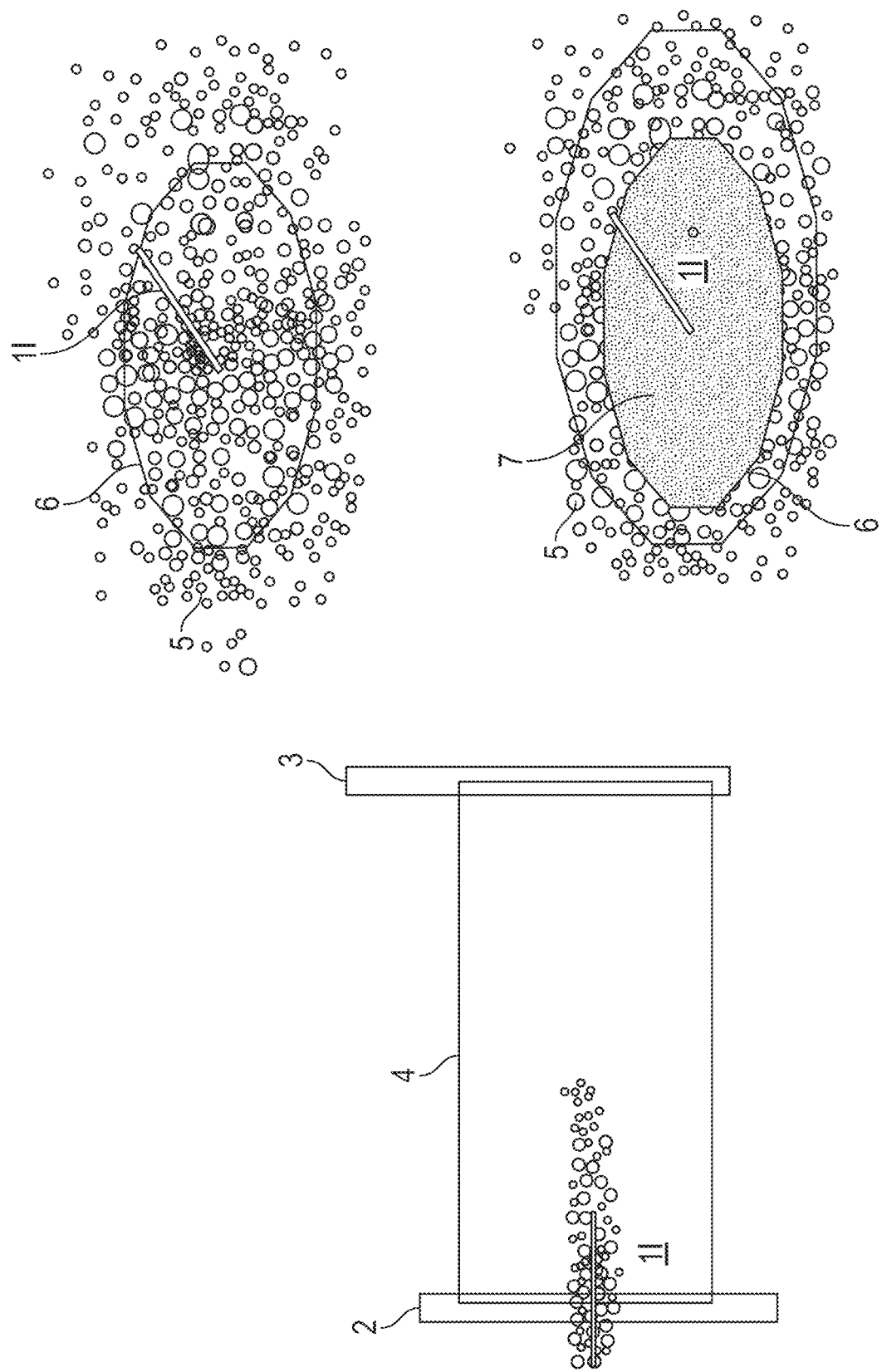

FIG. 13 is a graph of fracturing wherein dimensions of propped fracture height, length and width may be determined.

To facilitate understanding, identical reference numerals have been used, where possible, to designate identical elements that are common to the figures ("FIGS."). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

The present disclosure describes a method for electromagnetics-based method for estimation of hydraulic fracture geometry (HFG). Aspects of the present disclosure focus mainly on estimation of HFG in horizontal wells.

The present disclosure proposes a method to estimate and model all or at least two parameters of HFG in predominantly horizontal or nearly horizontal wells, by use of inter-well electromagnetic recordings. One aspects of the disclosure is the difference in salinity, or more precisely resistivity, of the fracturing fluid and the resident fluid (hydrocarbon or formation water). The fracturing fluid is usually significantly less resistive than the hydrocarbon that is the dominant resident fluid where fracturing is usually conducted, or less resistive than the formation water in case the HF occurs in high water saturation regions. Therefore, the resistivity contrast between the two fluids will demarcate the boundary of hydraulic fractures and thus help in precisely modelling some or all parameters of HFG. The inter-well recordings can be interpreted along a 2D plane between the two wells, one of them bearing the transmitter and the other with receiver. The interpretations in a 2D plane can be used to calibrate a 3D unstructured HF model, thereby introducing a reliable calibration input that did not exist before. There can be multiple such 2D planes as more than one well can have a receiver, and in that case the 3D HF model has more calibration data and is even more precise.

The present disclosure drastically improves precision in HFG estimation and modelling because of the ability to demarcate only the open portion of the HF and not the entire volume where pumping fluid entered but parts of it closed soon enough and would never contribute to the production from the well. Today, the industry, by its best methods, can only see the entire rock volume that broke due to fracturing, although significant parts of that broken volume might not be contributing to the production and thus are irrelevant in the 3D models.

Figure 1:
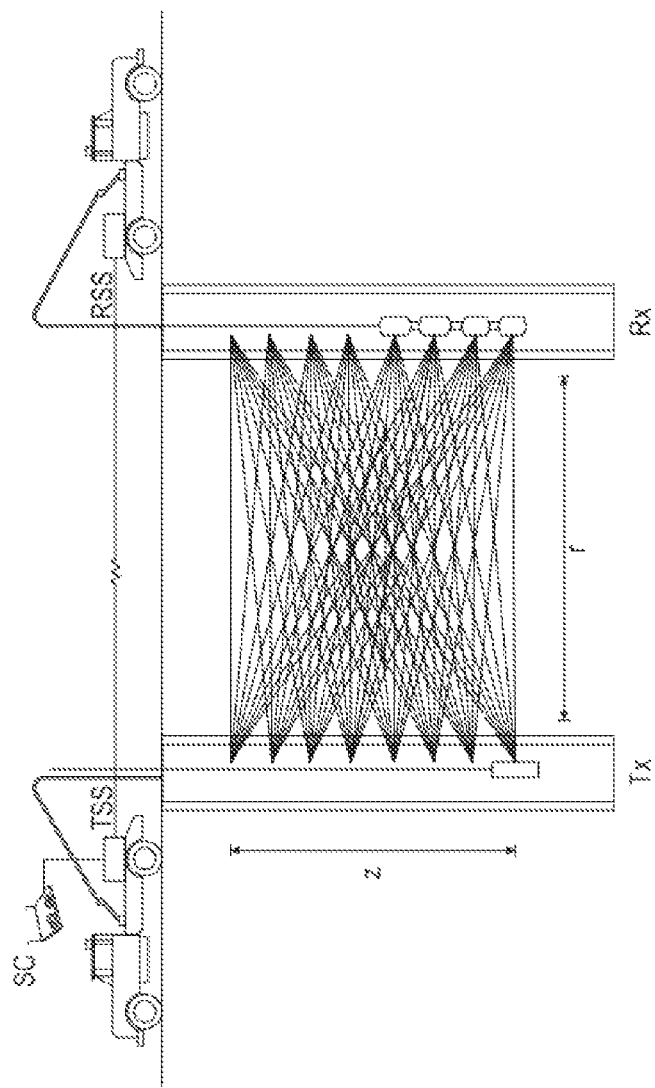
FIG. 1 is a typical arrangement in the field, in one example embodiment of the disclosure.

Crosswell electromagnetic uses the principles of electromagnetic induction and tomography to provide an image of the resistivity distribution between boreholes. The typical field set-up (FIG. 1) includes two boreholes, spaced X distance apart with a depth range, Z. Inter-well measurements are conducted by placing the transmitter in one well to broadcast EM signals throughout the formation. At the other well, an array of induction coil (magnetic field) receivers detect these signals. Imaging the inter-well space is completed by locating these sources and receivers at regularly spaced (about 2 to 5% of the inter-well distance, X) intervals below, within, and above the depth range of interest. Several thousand measurements interpreted together provide the crosswell resistivity structure.

It is usually recommended that for a field recording of crosswell EM, the ratio of Z over X should be greater than 0.2, and one of the wells should be open hole. If both wells are cased hole, the attenuation caused by carbon casing heavily hampers the acquisition. However, if the two wells have chrome or fiber casing, the attenuation is reduced and the acquisition may be carried out.

Field data are collected using standard wireline logging conveyance or by coiled tubing conveyance. Although the receivers are slimmer, they often consist of multilevel coil strings, so the full tool length can be quite long. The acquisition strategy involves holding several receivers at a certain depth range in one well to acquire data while the transmitter sonde continuously moves throughout the depth interval of interest in the second well. After the specified depth interval is logged, the receivers are moved to a new depth and the process is repeated until both the source and receiver tools have covered the full depth interval.

Field data are interpreted by fitting the measurements to calculated data from a numerical model, using an inversion procedure. It begins with a resistivity model, usually derived from prior knowledge of the field area including geologic knowledge, logs, cores, and seismic data. The model response is calculated using a forward EM code and the model parameters are adjusted by inversion until the observed and calculated data fit within a specified tolerance. A numerical algorithm that calculates the electromagnetic fields within a 2D rectangular grid drives the sensitivity and inversion algorithms. Although the inversion process results in non-unique models, using field data as a guide and exercising reasonable model constraints in fitting the data aids in selecting the best model.

Crosswell electromagnetic (EM), though a powerful tool to characterize reservoir for waterflood management, has some limitations as well. It is a solution restricted to a small part of the field and a single acquisition cannot be used to understand large waterfloods at a full-field level. Also, it's a low-frequency acquisition method, i.e. acquired in interval of months or years and thus cannot be used for frequent and regular optimization of waterflood. Besides, crosswell electromagnetic data interpretations have been mostly used for qualitative analysis of waterflood monitoring. Very rarely have the crosswell electromagnetic interpretations been used to calibrate 3D reservoir model, such that the interpretation can guide future production-injection forecasts generated from 3D simulation models. This is majorly because regression and optimization of 3D models to match with interpretation results of crosswell electromagnetic in the 2D section is not readily feasible.

In embodiments, we logically regress the model in order to use the crosswell EM results to guide future production and injection strategy of the field. This is an intermediate step in the workflow.

Workflow

Figure 2:
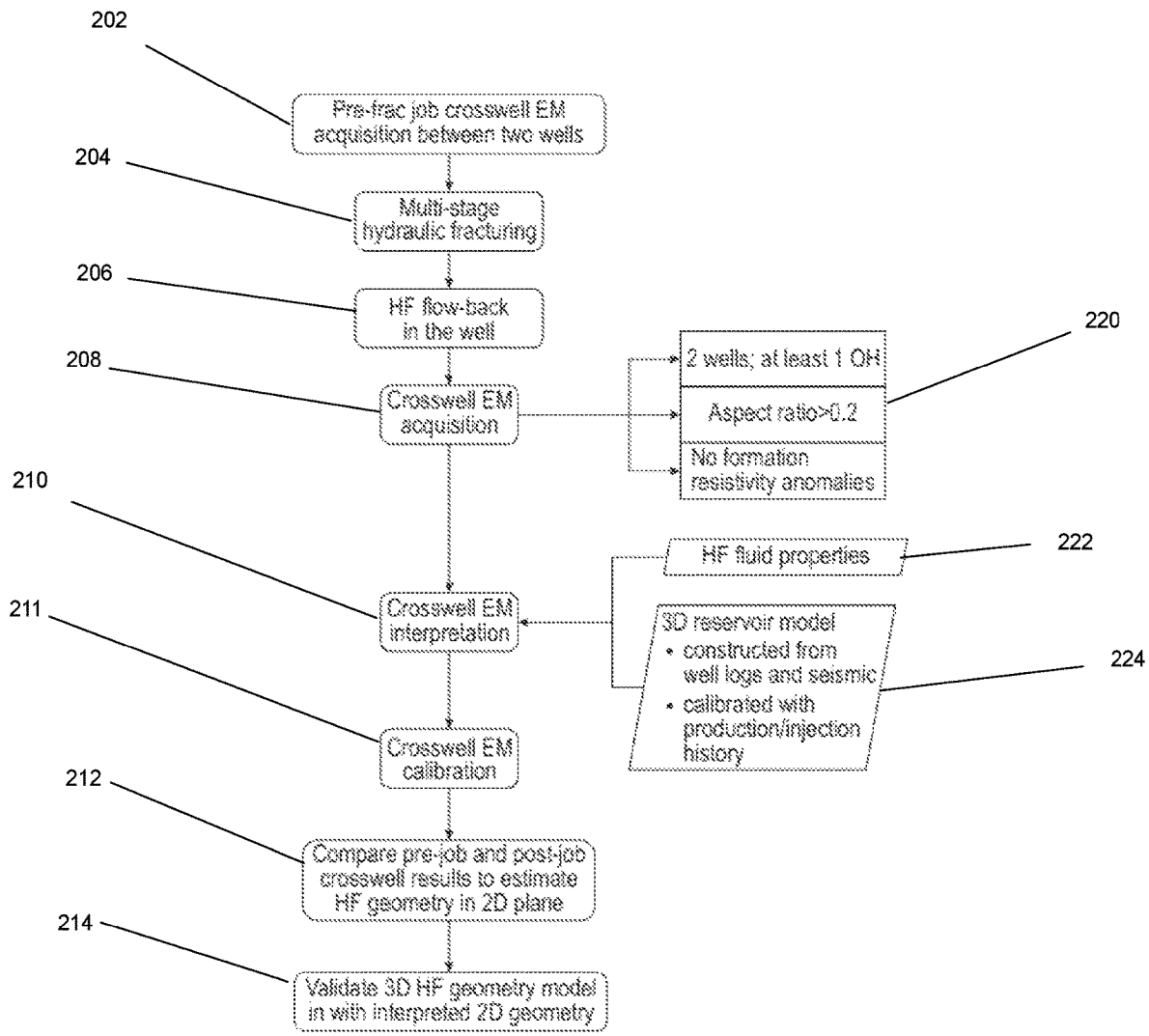
FIG. 2 is a higher resistivity contrast method in accordance with one example embodiment of the disclosure.

Aspects of the present disclosure are described in the form of a workflow. The workflow involves both field operations and interpretations. The workflow can be executed in two ways, the difference being an additional pre-job acquisition of crosswell EM. With the additional acquisition, the contrast between pre and post-job resistivity is higher and thus fracture geometry estimation is more precise. This method will also involve higher capital expenditure in terms of an additional acquisition. This method is specifically applicable for reservoirs where resistivity estimation is difficult or where there is less contrast between fracturing fluid and reservoir fluids. The two methods of executing the workflow are described as follows:

Method 1: Higher Resistivity Contrast Method (FIG. 2)

In this method, the workflow begins with a deeplook crosswell EM acquisition 202 between the HF candidate well and the neighboring well. It is assumed that the candidate selection for HFG estimation has been already done rightly considering the constraints of crosswell EM acquisition. The acquisition is, then, tomographically inverted into a 2D section of resistivity. Multi-stage hydraulic fracturing, at 204, is then executed following the defined hydraulic fracturing procedure. Once the fractures have been created, and the fracturing fluid is ready to be flown-back, at 206, another crosswell EM acquisition is taken at 208. Examples of data from 208 are illustrated at 220. Post hydraulic fracturing crosswell EM acquisition can measure, at 210, the change in subterranean formation resistivity on the 2D acquisition plane. Industry wide used fracturing fluid is generally highly saline and has low resistivity due to brine & ionic composition. HF properties may be input to 210, at 222 as well as modeling at 224. Certain amount of the pumped fracturing fluid leaks off into matrix porosity depending on reservoir quality and remaining liquid will be entrapped (for example in hydraulic fractures post fracturing). With a decrease of frac pressure due to fluid leakoff, fracture closes on proppant pack below minimum in-situ stress and therefore propped fracture is the only high porous region in reservoir having large connected porosity and permeability which can still hold significant volume of low resistive fracture fluid. This low resistivity can be distinctly measured by 2D acquisition plane and thus the propped fracture trace can be identified as a low resistive region connected to the wellbore.

At this step of the workflow, there are two crosswell EM interpretations available—pre-job and post-job—in the same 2D plane. A comparison, at 212, between the two will enable estimation of the HFG (depending on the 2D plane orientation).

A 3D reservoir model prepared for the full-field with seismic, geological, petrophysical, geomechanical, and reservoir engineering inputs is cut into a sector model so as to include only the two wells in consideration (HF candidate and the neighboring well). The sector model is then combined with the fracturing operational details, such as pumping schedule, fracturing fluid composition, etc. A numerical simulation with these inputs creates a HFG with unstructured grid to allow for better characterization. The unstructured grids, with polygonal cells of varying dimensions, can model planar as well as complex HF. The HFG thus modelled is usually uncalibrated or calibrated with acquisitions such as micro-seismic, which are an overestimation of HFG (as stated earlier). Therefore, the production/injection forecasts, and economic estimation, thus generated is uncertain and may lead to surprising outcomes.

In the proposed method, the parameters affecting the HF geometry in the model are regressed upon until the HFG matches with the crosswell EM interpreted HFG. The regression between the interpretation and the model is carried out using an objective function and an optimizer based on evolution strategy algorithm.

Once the HFG in the model matches closely with the interpreted HFG, the sector model is appropriately tied back to the full-field model. This step involves scaling the unstructured HF appropriately to a planar HF if the reservoir model includes a large number of wells. In order to ensure that the resolution of the HF is appropriately captured in the full-field model, a set of locally refined grids may be constructed in the HF region in the model. The locally refined grids can be suitably modelled so as to capture the HFG and high throughput in HF region in the model.

It is to be noted that if the reservoir model does not include a large number of wells, there is no need to cut-out a sector model and the HF modelling and calibration can be done on the full-field model itself.

Method 2: Normal Resistivity Contrast Method

In this method, the entire workflow is exactly the same as the former method except for the fact that there is no pre-job crosswell EM acquisition. It is understood that only a post-job crosswell EM acquisition at 211 would be sufficient to demarcate between fracturing fluid resistivity and resident fluid resistivity, except for the cases where either interpretation of formation resistivity is complex or contrast between fracturing fluid and resident fluid resistivity is less.

Results

The interpreted fracture profile from the low resistivity region on the 2D plane between fractured & monitored horizontal wellbore, represents the fracture intersection trace and can be assessed to determine the HFG characteristics. There can be two types of intersection planes depending on the inclination angle of the 2D plane created by the vertical difference between frac well & monitor well. (1) Horizontal 2D plane when both wells are at same depth (2) Inclined 2D plane when both wells have a vertical depth difference.

Fracture Geometry Interpretation

The low resistivity region on the 2D acquisition plane between the fracture & monitor horizontal wellbore, represents the fracture intersection on the plane and can be assessed to determine the HFG characteristics. Fracture intersection represents the fracture geometry across one side of the well, as the plane of acquisition measures one side of the well towards the monitor well. There can be two types of acquisition planes depending on the inclination angle of the 2D plane with the fracture well, due to the vertical depth difference between the fracture well & monitor well. (1) Horizontal 2D acquisition plane when both the wells have negligible/low vertical depth difference (2) Inclined 2D acquisition plane when both the wells have significant vertical depth difference.

This section describes the various established fracture geometry types in horizontal wells, how they can be interpreted and identified using the low resistivity fracture intersection on the 2D acquisition planes. Fracture geometry types in horizontal wells can be categorized into two types: Type-1 being 2D Planar vertical fracture and Type-2 is Non-planar fracture.

Type-1: 2D Planar Vertical Fracture

Hydraulic fractures are generally vertical 2D single planes, which varies from radial/ellipse to rectangle shaped plane, bi-wing axi-symmetric around the wellbore on both sides, as the minimum in-situ stress is mostly horizontal. A vertical 2D planar frac will be intersected as a straight line by the 2D acquisition plane between monitor and frac well. This straight line intersection will be visualized as a low resistivity profile which can be a rectangle shape with very high aspect ratio or a thick straight line and the minimum dimension will be equal to the lowest refinement in the 3D geomodel grid dimension, as discussed previously. The length dimension of this intersection rectangle/straight line profile represents the fracture length extension and the direction provides the azimuth of the fracture.

Figure 3:
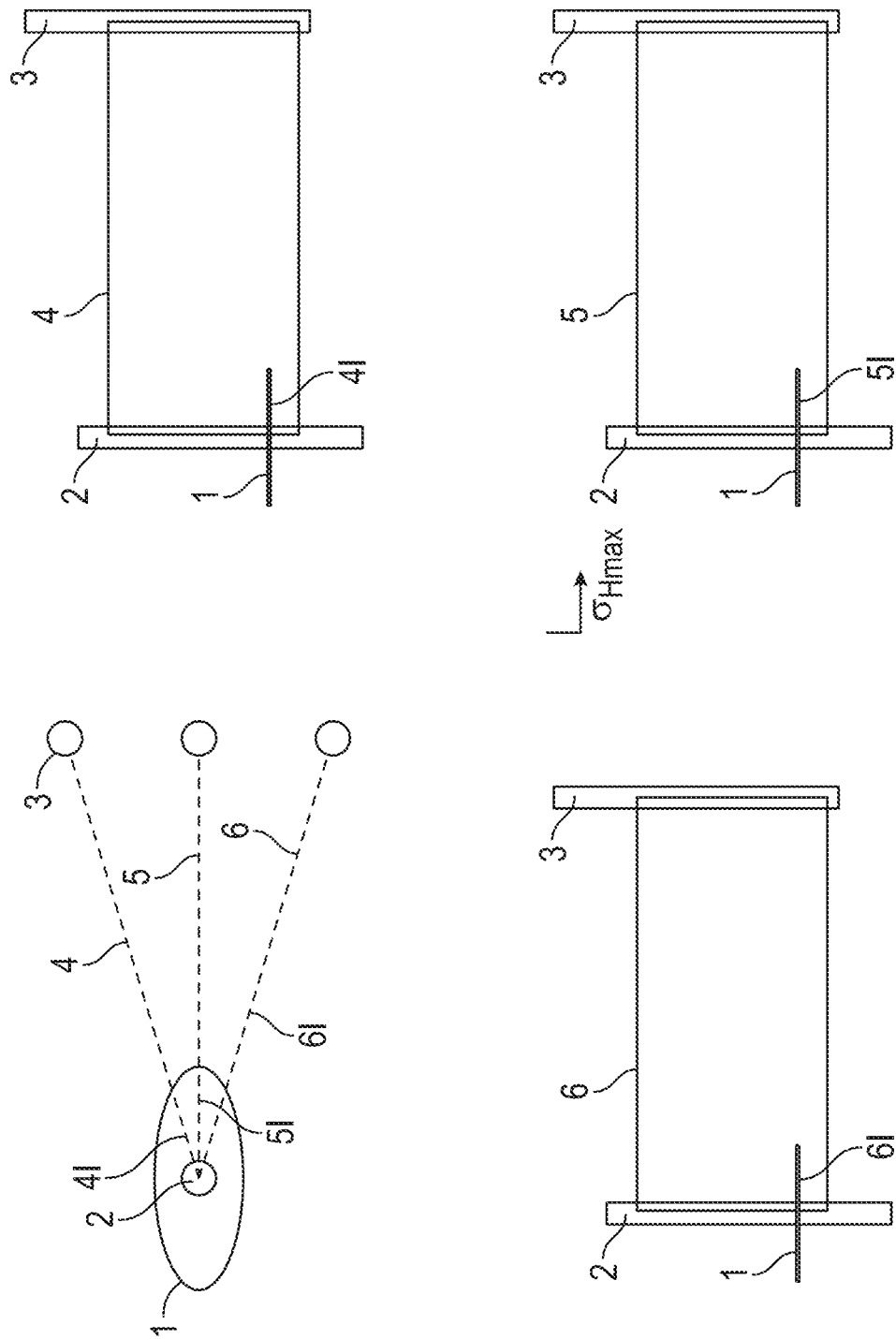
FIG. 3 is a low resistive region of high aspect ratio illustration in one example embodiment of the disclosure.

In a transverse wells, fracture intersection by the acquisition plane (at any angle) will be a straight line, therefore it will be represented by a low resistive region of high aspect ratio rectangle/thick straight line and will be orthogonal to the wellbore in direction of $\sigma_{hmax}$, as represented by FIG. 3.

In a 2D horizontal acquisition plane, if the fracture is contained within the fracture zone, then the plane can intersect the maximum extension of the fracture at one side of the frac well (towards monitor well). Therefore the length of the low resistive region will be equal to the maximum half-length of the propped fracture.

An inclined 2D acquisition plane will not intersect the maximum fracture half-length as the intersection occurs at an angle and can provide fracture half-length, azimuth.

Figure 4:
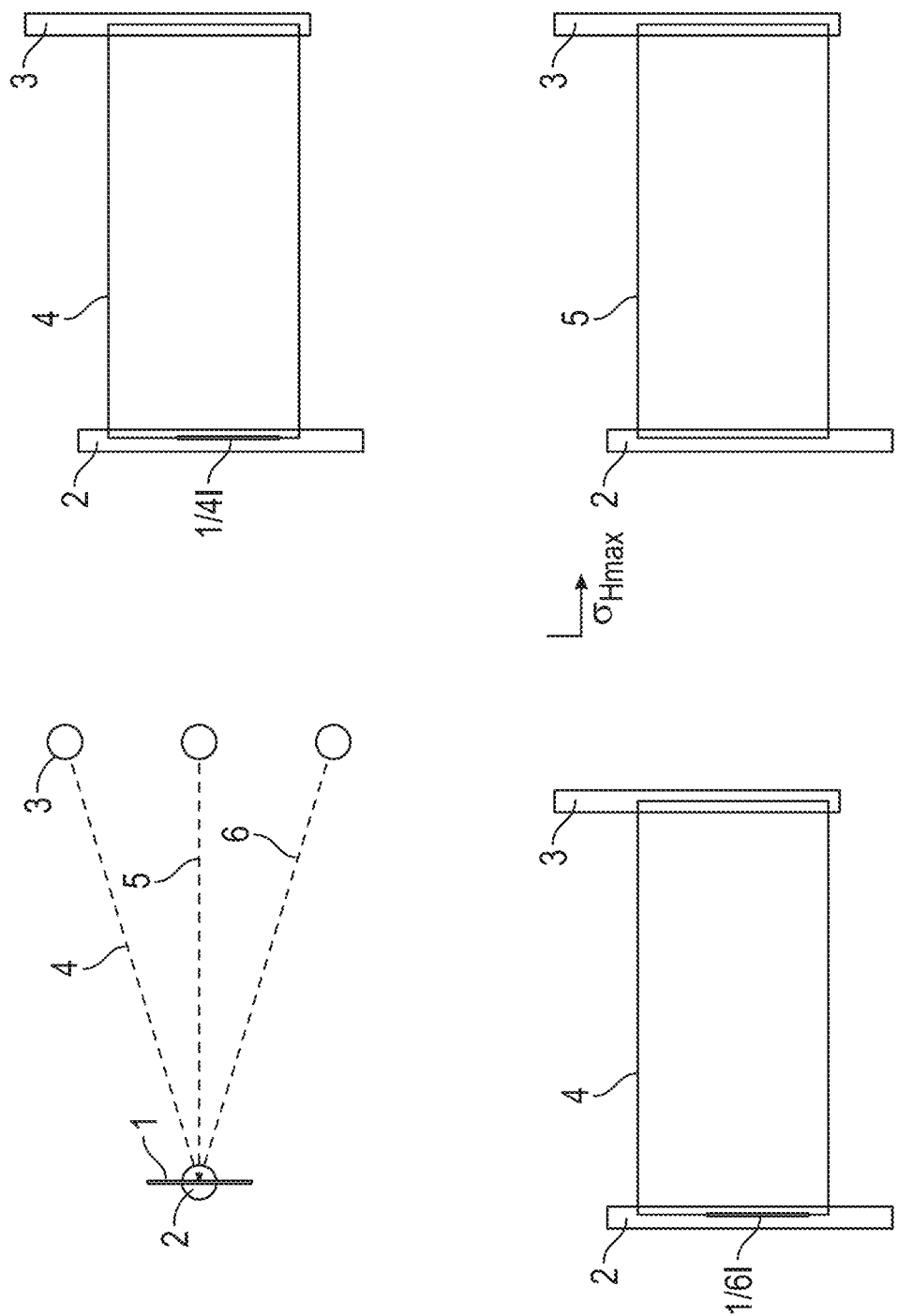
FIG. 4 is a fracture intersection that is represented by a low resistive trace (high aspect ratio rectangle/thick straight line) co-axial with the wellbore.

In longitudinal wells, axial fracture is initiated at the top & bottom of the wellbore. This axial fracture can be possibly intersected by an inclined 2D acquisition plane, provided it bears very high inclination angle (~50-80°). The fracture intersection will be represented by a low resistive trace (high aspect ratio rectangle/thick straight line) co-axial with the wellbore as shown by FIG. 4. An axial frac cannot be intersected by horizontal 2D acquisition plane and therefore fracture measurement is not possible when the fracture and monitor well at similar vertical depth, unless wellbore is slightly misaligned.

In reality it is extremely difficult to drill a perfectly aligned wellbore with $\sigma_{hmax}$ direction. In such cases fracture will be slightly misaligned from the wellbore axis and therefore a near-axial frac intersection can be measured by a 2D horizontal/Inclined planes generating a near-axial low resistive trace closer to wellbore axis.

Similarly for wells which are drilled at other angles (a) with the $\sigma_{hmax}$ direction, intersection by a 2D horizontal/Inclined planes generates the fracture length low resistive trace at the same angle (a) with the wellbore (FIG. 5).

Type-2: Non-Planar Fracture

Any fracture which is not a single plane or a plane by itself, is hereby referenced as a non-planar fracture and will include multiple fractures, complex fracture network, reoriented fractures, T-shape fracture etc. In horizontal wells, non-planar fractures are mostly prevalent in wells misaligned with the preferred fracture plane (PFP) of $\sigma_{hmax}$ direction, cased cemented wells and sometimes also dictated by subterranean zone rock & stress properties. A short synopsis of the industry understanding from the previous literatures, laboratory experiments and the interpretation using the crosswell EM acquisition planes are described further in the succeeding section.

Multiple Fractures

Fracturing in horizontal wells can result in one or multiple fractures depending on the completion type, wellbore orientation with in situ stress, perforation interval length & in situ stress magnitudes etc. The near-wellbore fracture initiations called as starter fractures, interact with each other as they grow bigger with the fracturing treatment and overlap with each other.

Various publications discuss the variation of the induced hydraulic fracture geometry for non-aligned wellbores with PFP $\sigma_{hmax}$ direction) for both cased-cemented perforated & open hole wells, which is incorporated by reference herein.

FIG. 6 shows the top view of fracture geometries for various wellbore angles with $\sigma_{hmin}$ ($\theta$), from a longitudinal fracture ($\theta=90°$) to a transverse fracture ($\theta=0°$) and highlights the below listed facts. These experimental works determined the complexity of fracture geometry from horizontal wells which are discussed below.

In longitudinal/near-longitudinal wellbores closely aligned with $\sigma_{hmax}$ ($\theta\sim=90°$) for both cased-cemented & open hole wells, it has been long established that these starter fractures which initiate as multiple fractures, overlap and combine with each other, to form an single planar longitudinal frac.

For transverse/near-transverse wellbores aligned with $\sigma_{hmin}$/perpendicular to PFP ($\theta\sim=0°$), overlap of the starter fractures are effected by the perforation interval length. If the perforation interval length is greater than 4 times wellbore diameter, these starter fractures may not link up & grow further as multiple transverse fractures. These multiple fractures compete with each other in the overlap area, as the overlapping fractures exert additional stress on each other (stress shadow effect) and few fractures cease to grow resulting in one or two dominant main fractures as shown in FIG. 7. For spiral perforated interval less than four times well diameter, starter fractures coalesce into a single transverse main fracture (fan-like shape) as shown in FIG. 8. In case of open hole transverse wells, longitudinal fracture initiates near-wellbore from top & bottom sides of the well due to altered hoop stresses until certain distance and further reorients into far-field transverse fracture which creates a sharp curvaceous fracture as shown in FIG. 9.

For cased cemented/open hole wellbores aligned at an angle between 10°-80° with PFP, the starter fractures initiates on wellbore axis and further reorients towards far-field PFP, creating a curvaceous fracture at the reorientation as shown in FIG. 6.

Intersection of all above non-planar fractures by cross well 2D horizontal/inclined plane on one side of the well (where monitor well exists), will create a low resistive region of fracture intersections as shown in FIG. 6A top view. This FIG. 6A shows comparison of 2D plane low resistive fracture intersection with a top view of various non-aligned wellbore angle fractures (FIG. 6). In this figure, monitor well is assumed to be parallel to the fracture well on the right hand side, therefore the fracture intersection occurs on the same side of the well. In an horizontal 2D plane of acquisition, the fracture half-length can be almost equal to maximum frac half-length provided the fracture is contained in the same zone. As discussed earlier axial fractures will not be intersected IN horizontal plane. In an inclined 2D plane of intersection, the frac half-length intersection will be less than the frac half-length intersection of 2D horizontal plane and axial planes can be intersected.

Complex fracture network: The complex fracture network geometry may be wide-varied and its growth will depend on the characteristics of natural fractures/fissures like aperture, density, length, interaction of main fracture with them and the stress regime.

In subterranean zone with pre-existing natural fractures/fissures, a complex fracture network is created due to the combination of (1) initial fracture extension in maximum stress direction (2) extension along the natural fractures/fissures when main fracture intersects them (3) re-orientation towards original frac direction, forming an orthogonal set of interconnected fractures. These three steps of frac propagation can result in various types of complex fractures as shown in FIG. 10. Therefore a 2D plane intersection (horizontal/inclined) will show a network of low resistive thick line traces in the top view at one side of well (towards monitor well) as shown in FIG. 10. The elongated side of this network represents propped frac half-length, direction of this half-length provides fracture azimuth and shorter side represents propped fracture network width. The network traces can reveal the natural fractures/fissures distribution and its density.

Horizontal Fractures

Horizontal fractures are generated when the overburden stress is the minimum stress among three principle stresses in scenarios like shallow fracturing zone depth, tectonic activity, underlying salt domes structures etc. These are typically formed in two shapes T-shape and pan-cake shaped horizontal frac.

T-shape horizontal fracture: This fracture initiates as a vertical axial fracture near-wellbore and further reorients into horizontal plane at weak interfaces of bedding planes as shown in FIG. 11. T-shape fracture can only be intersected by an inclined 2D acquisition plane and is represented by a low resistivity region (thick line/high aspect ratio rectangle) of an axial fracture away from the wellbore. The offset distance from the well depends on the location of 2D plane intersection with the horizontal fracture plane of T-shape fracture.

Pan-cake horizontal frac: In some scenarios, a horizontal frac can be initiated on the wellbore itself resulting in a pan-cake/radial shaped horizontal fracture directly connected to the wellbore. This can be intersected only by a perfect 2D horizontal acquisition plane coplanar with the fracture and one side of the fracture will be captured as a half ellipse/pan-cake/radial shape low resistivity profile as shown in FIG. 12.

Horizontal fracture determination will have to be further confirmed from the integrated interpretation of fracturing treatment pressures (greater than overburden stress), geomechanical models indicating overburden stress as the minimum stress and fracturing treatment observations of flattened net pressures followed by premature job termination during the proppant stages.

Extended Applications

Microseismic

As discussed earlier, microseismic processing interprets the rock failure location from the measured seismic waves (Compressional & Shear waves) and integrates them towards fracture geometry interpretation, however proppant placement in the created fracture and its openness still remains a major uncertainty. The low resistivity fracture region on the 2D intersection planes can serve as an excellent calibration to solve this uncertainty of the microseismic interpretation. This low resistivity fracture intersection can be used to characterize and calibrate the microseismic attributes, moment magnitudes and other geophysical characteristics around the propped fracture. Further the calibrated attributes can be further used to predict the propped fracture events in regions other than 2D plane of intersection, to generate a complete propped fracture microseismic cloud. Finally the dimensions of propped fracture height, length, width, etc. can be determined as shown in FIG. 12 and FIG. 13.

3D Fracture Modelling:

Modern tools of hydraulic fracture modelling using 3D geomechanical & reservoir models incorporating seismic, geological, petrophysical, reservoir & geomechanical data can be used to create accurate 3D fracture models using Hydraulic fracture modelling software. In case of pre-existing natural fracture system, inputs of discrete fracture network (DFN) can be imported from the 3D geological models into the fracture models to simulate fracture propagation across the fracture network. Unconventional fracture modelling (UFM) simulations can be run to create a 3D complex/planar fracture geometries. During the fracture geometry simulation process, typically engineers have a good understanding of fracture height due to the calibrated geomechanical models, vertical offset wells frac height acquisitions & treatment pressure observations, leaving us the main uncertainty of fracture half-length. Such activities may be performed, for example, at 214.

To solve this, simulated fracture geometry can be overlaid with the low resistivity fracture half-length intersection region and the fracture model can be calibrated to match the fracture half-length. The calibrated fracture model can be further used to predict a realistic complete propped fracture geometry in regions other than cross well 2D plane of acquisition, as shown in FIG. 12 and FIG. 13. In scenarios of complex and/or multiple fractures, this low resistivity profile can be used excellent tool to calibrate the DFN and complex fracture in the plane of acquisition and further predict the complete propped fracture geometry.

Addition of seismic or microseismic data builds higher accuracy to this calibration process as shown in FIG. 12 and FIG. 13.

UFM creates locally refined geocellular grids capturing propped hydraulic fracture geometry, which will be imported into reservoir dynamic models to forecast production, as mentioned in the last step of the workflow.

Examples of the claims will now be disclosed. In one embodiment, a method for estimating hydraulic fracture geometry is disclosed, comprising performing a first cross-well electromagnetic survey between a first well and a second well to achieve first results and performing a hydraulic fracturing in one of the first well and the second well. The method may further comprise performing a flow back in one of the first well and the second well and performing a second cross-well electromagnetic survey between the first well and the second well to achieve second results. The method may also comprise performing a cross-well electromagnetic interpretation of the second cross-well electromagnetic survey and performing a cross-well electromagnetic calibration based upon results of the cross-well electromagnetic interpretation. The method may also comprise comparing the first results with the second results to estimate a hydraulic fracture geometry in a two-dimensional plane; and validating a three-dimensional hydraulic fracturing model with the hydraulic fracture geometry in the two-dimensional plane.

In another example embodiment, the method may be performed, wherein the hydraulic fracturing is a multi-stage hydraulic fracturing.

In another example embodiment, the method may be performed, wherein hydraulic fracturing fluid properties are used in the cross-well electromagnetic interpretation.

In another example embodiment, the method may be performed, wherein a reservoir model is used in the cross-well electromagnetic interpretation.

In another example embodiment, the method may be performed, wherein the reservoir model is a three-dimensional reservoir model.

In another example embodiment, the method may be performed, wherein the three-dimensional reservoir model is constructed from at least one well log.

In another example embodiment, the method may be performed, wherein the three-dimensional reservoir model is constructed from seismic data.

In another example embodiment, the method further comprise performing at least one seismic survey of the reservoir prior to performing hydraulic fracturing.

In another example embodiment, the method may be performed, wherein the three-dimensional reservoir model is calibrated from a well production history.

In another example embodiment, the method may be performed, wherein the three-dimensional reservoir model is calibrated from a reservoir injection history.

In another example embodiment, the method may be performed, wherein the flow back is a hydraulic fracturing fluid flow back.

In another example embodiment, a method for estimating hydraulic fracture geometry is disclosed. The method may comprise obtaining results from a first cross-well electromagnetic survey between a first well and a second well to achieve first results and obtaining results from a second cross-well electromagnetic survey between the first well and the second well to achieve second results, wherein the second cross-well electromagnetic survey is conducted after a hydraulic fracturing in one of the first well and the second well. The method may also comprise performing a cross-well electromagnetic interpretation of the second cross-well electromagnetic survey; and performing a cross-well electromagnetic calibration based upon results of the cross-well electromagnetic interpretation. The method may also comprise comparing the first results with the second results to estimate a hydraulic fracture geometry in a two-dimensional plane and validating a three-dimensional hydraulic fracturing model with the hydraulic fracture geometry in the two-dimensional plane.

In another example embodiment, the method may be performed, wherein the hydraulic fracturing is a multi-stage hydraulic fracturing.

In another example embodiment, the method may be performed, wherein hydraulic fracturing fluid properties are used in the cross-well electromagnetic interpretation.

In another example embodiment, the method may be performed, wherein a reservoir model is used in the cross-well electromagnetic interpretation.

In another example embodiment, the method may be performed, wherein the reservoir model is a three-dimensional reservoir model.

In another example embodiment, the method may be performed, wherein well logs are used in the three-dimensional reservoir model.

In another example embodiment, the method may be performed, wherein seismic data is used to construct the three-dimensional reservoir model.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method for estimating hydraulic fracture geometry, the method comprising:
   performing a first cross-well electromagnetic survey between a first well and a second well to achieve first results;
   performing a hydraulic fracturing in one of the first well and the second well;
   performing a flow back in one of the first well and the second well;
   performing a second cross-well electromagnetic survey between the first well and the second well to achieve second results;
   performing a cross-well electromagnetic interpretation of the second cross-well electromagnetic survey, the performing the cross-well electromagnetic interpretation comprising using a reservoir model;
   performing a cross-well electromagnetic calibration on the reservoir model based upon results of the cross-well electromagnetic interpretation;
   comparing the first results with the second results to estimate a hydraulic fracture geometry in a two-dimensional plane; and
   validating a three-dimensional hydraulic fracturing model with the hydraulic fracture geometry in the two-dimensional plane.

2. The method according to claim 1, wherein the hydraulic fracturing is a multi-stage hydraulic fracturing.

3. The method according to claim 1, wherein hydraulic fracturing fluid properties are used in the cross-well electromagnetic interpretation.

4. The method according to claim 1, wherein the reservoir model is a three-dimensional reservoir model.

5. The method according to claim 4, wherein the three-dimensional reservoir model is constructed from at least one well log.

6. The method according to claim 4, wherein the three-dimensional reservoir model is constructed from seismic data.

7. The method according to claim 6, further comprising performing at least one seismic survey of the reservoir prior to performing hydraulic fracturing.

8. The method according to claim 6, wherein the three-dimensional reservoir model is calibrated from a well production history.

9. The method according to claim 6, wherein the three-dimensional reservoir model is calibrated from a reservoir injection history.

10. The method according to claim 1, wherein the flow back is a hydraulic fracturing fluid flow back.

11. A method for estimating hydraulic fracture geometry, the method comprising:
    obtaining results from a first cross-well electromagnetic survey between a first well and a second well to achieve first results;
    performing a hydraulic fracturing in one of the first well and the second well;
    obtaining results from a second cross-well electromagnetic survey between the first well and the second well to achieve second results, the second cross-well electromagnetic survey being conducted after the performing the hydraulic fracturing in one of the first well and the second well;
    performing a cross-well electromagnetic interpretation of the second cross-well electromagnetic survey, the performing the cross-well electromagnetic interpretation comprising using a reservoir model;
    performing a cross-well electromagnetic calibration on the reservoir model based upon results of the cross-well electromagnetic interpretation;
    comparing the first results with the second results to estimate a hydraulic fracture geometry in a two-dimensional plane; and
    validating a three-dimensional hydraulic fracturing model with the hydraulic fracture geometry in the two-dimensional plane.

12. The method according to claim 11, wherein the hydraulic fracturing is a multi-stage hydraulic fracturing.

13. The method according to claim 11, wherein hydraulic fracturing fluid properties are used in the cross-well electromagnetic interpretation.

14. The method according to claim 11, wherein the reservoir model is a three-dimensional reservoir model.

15. The method according to claim 14, wherein well logs are used in the three-dimensional reservoir model.

16. The method according to claim 14, wherein seismic data is used to construct the three-dimensional reservoir model.

* * * * *